United States Patent
Susan et al.

(10) Patent No.: US 11,990,252 B2
(45) Date of Patent: May 21, 2024

(54) HERMETIC ELECTRICAL FEEDTHROUGH COMPRISING A Pt—Ni-BASED PIN ALLOY

(71) Applicants: National Technology & Engineering Solutions of Sandia, LLC, Albuquerque, NM (US); Deringer-Ney, Inc., Bloomfield, CT (US)

(72) Inventors: Donald F. Susan, Albuquerque, NM (US); Zahra Ghanbari, Albuquerque, NM (US); Steve Xunhu Dai, Albuquerque, NM (US); Brenton Elisberg, Albuquerque, NM (US); Edward F. Smith, III, Madison, CT (US); Patrick K Bowen, Windsor, CT (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 442 days.

(21) Appl. No.: 17/227,965

(22) Filed: Apr. 12, 2021

(65) Prior Publication Data

US 2021/0327614 A1    Oct. 21, 2021

Related U.S. Application Data

(60) Provisional application No. 63/011,428, filed on Apr. 17, 2020.

(51) Int. Cl.
  *H01B 17/30*   (2006.01)
  *C03C 8/24*    (2006.01)
  (Continued)

(52) U.S. Cl.
  CPC .............. *H01B 17/305* (2013.01); *C03C 8/24* (2013.01); *C03C 27/02* (2013.01); *C22C 5/04* (2013.01)

(58) Field of Classification Search
  CPC ....... H01B 17/305; C03C 27/02; C03C 3/097; C03C 8/24; C03C 10/0027; C22C 5/04;
  (Continued)

(56) References Cited

U.S. PATENT DOCUMENTS

| | | | |
|---|---|---|---|
| 5,227,250 A | * | 7/1993 | Bobal ..................... C03C 27/02 65/59.1 |
| 5,820,989 A | * | 10/1998 | Reed ..................... C03C 27/044 428/34.4 |

(Continued)

OTHER PUBLICATIONS

Susan, D.F. et al., "Characterization of Continuous and Discontinuous Precipitation Phases in Pd-Rich Precious Metal Alloys," Metallurgical and Materials Transactions A, vol. 45A (2014), pp. 3755-3766.

(Continued)

*Primary Examiner* — Steven T Sawyer
(74) *Attorney, Agent, or Firm* — Kevin W. Bieg (57) ABSTRACT

A combination of materials and processing parameters have been developed for hermetic seals for electrical feedthroughs in high performance applications. A glass-ceramic forms a hermetic seal between a stainless steel shell and a platinum-nickel-based (Pt—Ni) pin alloy for electrical feedthroughs. The glass-ceramic is processed to develop a coefficient of thermal expansion (CTE) slightly higher than the pin alloy but lower than the stainless steel. The seal system employing the new processing conditions and Pt—Ni-based pin alloy alleviates several problems encountered in previous seal systems and improves the hermetic connector performance.

6 Claims, 7 Drawing Sheets

(51) Int. Cl.
*C03C 27/02* (2006.01)
*C22C 5/04* (2006.01)

(58) Field of Classification Search
CPC ....... C22C 38/001; C22C 38/02; C22C 38/40; C22C 38/58
See application file for complete search history.

(56) References Cited

U.S. PATENT DOCUMENTS

| | | | |
|---|---|---|---|
| 8,082,663 B1 | 12/2011 | Monroe et al. | |
| 8,310,253 B1* | 11/2012 | Mardi | G01R 1/07307 324/754.01 |
| 10,858,722 B2 | 12/2020 | Bowen et al. | |
| 2003/0134194 A1* | 7/2003 | Lasater | C03C 8/24 29/623.2 |
| 2006/0197542 A1* | 9/2006 | Tanaka | G01R 3/00 324/755.11 |
| 2010/0321057 A1* | 12/2010 | Yoshimura | B24B 19/16 451/36 |
| 2013/0060312 A1* | 3/2013 | Iyer | H05K 13/00 607/116 |
| 2014/0377129 A1* | 12/2014 | Shishino | C22C 30/06 420/587 |

OTHER PUBLICATIONS

Dai, S. et al., "Sealing Glass-Ceramics with Near Linear Thermal Strain, Part I: Process Development and Phase Identification," J. Am. Ceram. Soc., vol. 99 [11] (2016), pp. 3719-3725.

* cited by examiner

HERMETIC ELECTRICAL FEEDTHROUGH COMPRISING A Pt—Ni-BASED PIN ALLOY

CROSS-REFERENCE TO RELATED APPLICATION

This application claims the benefit of U.S. Provisional Application No. 63/011,428, filed Apr. 17, 2020, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to electrical feedthroughs and, in particular, to a hermetic electrical feedthrough comprising a Pt—Ni-based pin alloy.

BACKGROUND OF THE INVENTION

Single pin or multiple-pin connectors featuring hermetic electrical feedthroughs utilize a glass-ceramic for electrical isolation and to form a hermetic seal between the metal shell and the metal feedthrough (pin). In general, the coefficient of thermal expansion (CTE) of the glass-ceramic can be altered over a relatively broad range by changes in the thermal sealing profile thus allowing the CTE to be a closer match to the CTE of the shell or the pin and thereby minimizing residual tensile stresses in the glass-ceramic seal while maintaining compressive stresses along interfaces that maintain hermeticity. Previous high performance electrical feedthroughs have used a palladium-silver pin alloy that requires a complex heat treatment process to age-harden the palladium-silver alloy and achieve a proper CTE match between the alloy and glass-ceramic.

SUMMARY OF THE INVENTION

The present invention is directed to a hermetic electrical feedthrough, comprising a stainless steel shell having a feedthrough opening, an electrical feedthrough pin comprising a platinum-nickel-based ternary or higher alloy within the feedthrough opening in the stainless steel shell, and a glass-ceramic encasing the electrical feedthrough pin and forming a hermetic seal to the stainless steel shell and the electrical feedthrough pin.

As an example, electrical feedthrough pins comprising a Pt—Ni—Re alloy (Deriney®-72, a registered trademark of Deringer-Ney, Inc., Bloomfield, Connecticut) were sealed with belt processable S (BPS) glass-ceramic insulator and a 304L stainless steel shell. A thermal sealing profile was developed to generate a CTE in the glass-ceramic which is compatible with the Deriney-72 pin material. The Deriney-72 alloy provides higher margin with respect to partial pin melting during sealing than prior pin materials; exhibits less interdiffusion and phase formation and, therefore, a uniform microstructure in the bulk and near the pin/glass-ceramic interface in both the pin alloy and the glass-ceramic; exhibits high hardness after sealing, with measured values about 400 Knoop; maintains a compressive stress state within the glass-ceramic throughout most of the temperature range from −55 to +500° C.; and the seal remains hermetic, even after thermal shock treatments between −55 and +85° C.

BRIEF DESCRIPTION OF THE DRAWINGS

The detailed description will refer to the following drawings, wherein like elements are referred to by like numbers.

DETAILED DESCRIPTION OF THE INVENTION

Figure 1:
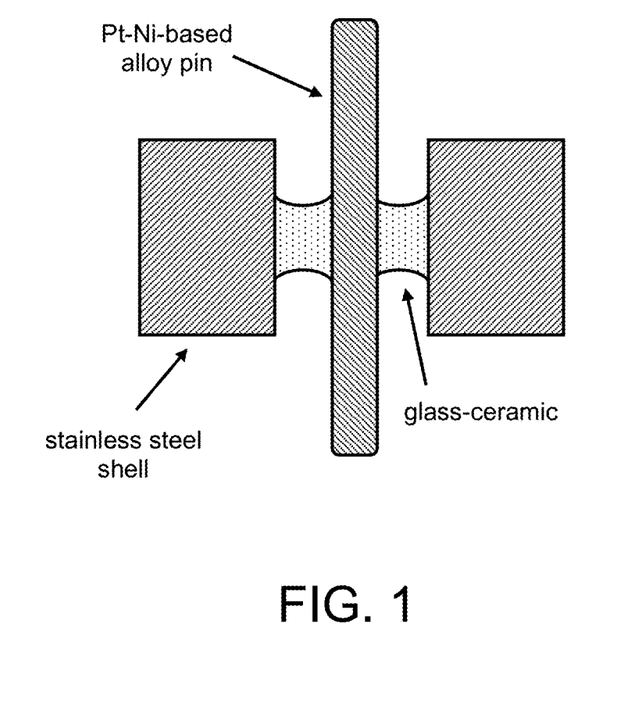
FIG. 1 is a schematic illustration of a coaxial single-pin glass-ceramic to metal seal connector that provides a hermetic, electrical connection between two electrical components.

The present invention is directed to a new glass-ceramic sealing system and a thermal processing method that can be used to make a hermetically sealed electrical feedthrough. As shown in FIG. 1, a single-pin feedthrough comprises a stainless steel shell, a feedthrough pin comprising a platinum-nickel-based (Pt—Ni) alloy, and a glass-ceramic sealant. The Pt—Ni-based pin is encased (sealed) in the glass-ceramic material which in turn is housed in the stainless steel shell. The stainless steel shell and the pin can be coaxial, in which the feedthrough opening or hole in the stainless steel shell is concentric with and encloses the center cylindrical pin. However, other feedthrough configurations are also possible, such as multi-pin connectors or headers. The pin extends through the electrically insulating glass-ceramic material and makes an electrical connection between two electrical components (not shown) on either side of the feedthrough. The stainless steel preferably has a coefficient of thermal expansion (CTE) that is equal or higher than the CTE of the glass-ceramic material at the operating temperature of interest. For example, the stainless steel shell can comprise any austenitic stainless steel alloy, such as 304L or Nitronic 40, which has a high CTE. For example, the glass-ceramic sealant can be a lithium aluminosilicate glass-ceramic having a moderate CTE. Lithium aluminosilicate glass-ceramics comprise $Li_2O$, $SiO_2$, and $Al_2O_3$, usually modified with a small amount of other oxides (for example $K_2O$, $B_2O_3$, ZnO, etc., and often $P_2O_5$) and have been extensively used for sealing electrical feedthroughs in metal housings. $Li_2O$ and $P_2O_5$ provide the source for formation of $Li_3PO_4$, the high temperature crystal nucleating agent. For example, the glass-ceramic can be a recrystallizable, belt processable S (BPS) glass-ceramic composed of $SiO_2$ (65-80 wt. %), $Li_2O$ (8-16 wt. %), $Al_2O_3$ (2-8 wt. %), $P_2O_5$ (1-5 wt. %), $K_2O$ (1-8 wt. %), $B_2O_3$ (0.5-7 wt. %), and ZnO (0-5 wt. %). See U.S. Pat. No. 5,820,989, issued Oct. 13, 1998, which is incorporated herein by reference. The pin comprises a ternary or higher alloy based on the Pt—Ni system, such as described in U.S. Pat. No. 10,858,722, issued Dec. 8, 2020, which is incorporated herein by reference. These alloys have a nominal composition of about 65 to 80 wt. % Pt, 18 to 27 wt. % Ni, and 2 to 8 wt. % of a ternary or higher addition comprising one or more of Ir, Pd, Rh, Ru, Nb, Mo, Re, W, or Ta. As an example, the pin can comprise a Pt—Ni—Re alloy. In the examples described below, the pin alloy comprised Deriney-72 (referred to as Alloy 2072 in U.S. Pat. No. 10,858,722) available from Deringer-Ney, Inc., having an approximate composition of 71.44 wt. % Pt, 21.8 wt. % Ni, and 5.76 wt. % Re (i.e., 47.7 at. % Pt, 48.3 at. % Ni, and 4 at. % Re). Due to the Pt precious metal content, these pins have good corrosion resistance and do not require gold electroplating for corrosion protection of the feedthrough.

Figure 2A:
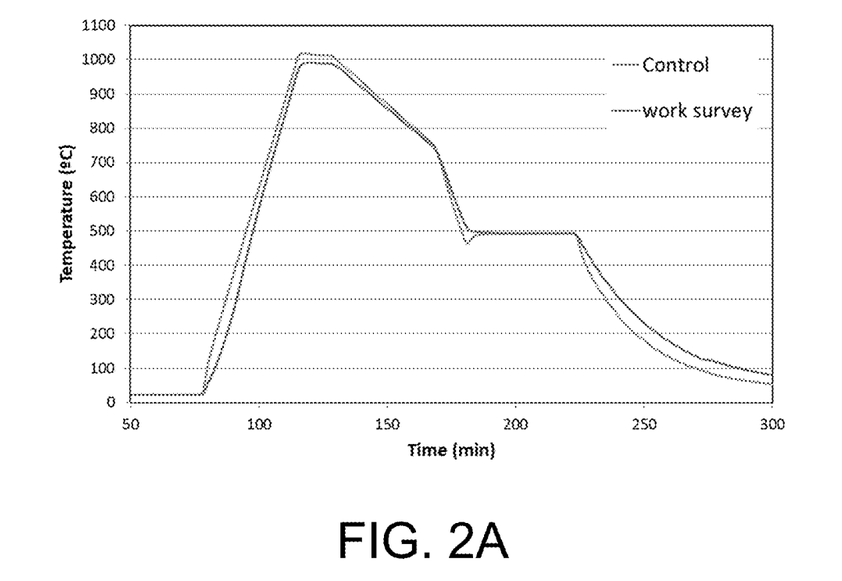
FIG. 2A is a thermal profile for a glass-ceramic seal with a Paliney®-7 alloy pin material, with an age-hardening isothermal hold at about 500° C.

Previous hermetic electrical connections have used a palladium-silver age-hardenable alloy for the pin material. See U.S. Pat. No. 8,082,663, issued Dec. 27, 2011, which is incorporated herein by reference. For example, Paliney®-7, available from Deringer-Ney Inc., has an approximate composition of 34% Pd, 30% Ag, 10% Pt, 10% Au, 15% Cu and less than 1% zinc (Paliney®-7 is a registered trademark of Deringer-Ney, Inc., Bloomfield, Connecticut). In order to develop the proper CTE to be compatible with the Paliney-7 pin alloy, the BPS glass-ceramic can be processed according to the heat treatment shown in FIG. 2A. See U.S. Pat. No. 8,082,663. The glass can be subjected to a heat treatment process in either a belt furnace or a batch process by first melting the glass, allowing it to flow and wet the metal components, and crystallizing $Li_3PO_4$ from the fluid above 950° C. The glass-ceramic is held at approximately 950-1050° C. for 5-60 minutes in an inert atmosphere, thereby nucleating cristobalite from the $Li_3PO_4$ crystallites and forming a bond between the glass-ceramic and the metal components. The glass is then cooled to about 750-775° C. at a controlled rate of about 1-30° C./min, causing crystallization of lithium silicates and growth of cristobalite. This is followed by cooling to about 500° C. at a rate of about 25° C./min. The assembly is held at this temperature for about 40-50 minutes to precipitation harden (age harden) the Paliney-7 pin material, and then cooled further to room temperature at about 5-25° C./min. See D. F. Susan et al., *Metall. Mater. Trans. A* 45, 3755 (2014). This heat treatment produces a glass-ceramic material with a CTE between that of the 304L stainless steel shell (CTE of approximately 18 ppm/° C.) and the Paliney-7 pin material (CTE of approximately 14-15 ppm/° C.). With age hardening, the Knoop hardness of the Paliney-7 pin material is about 300 HK.

Figure 2B:
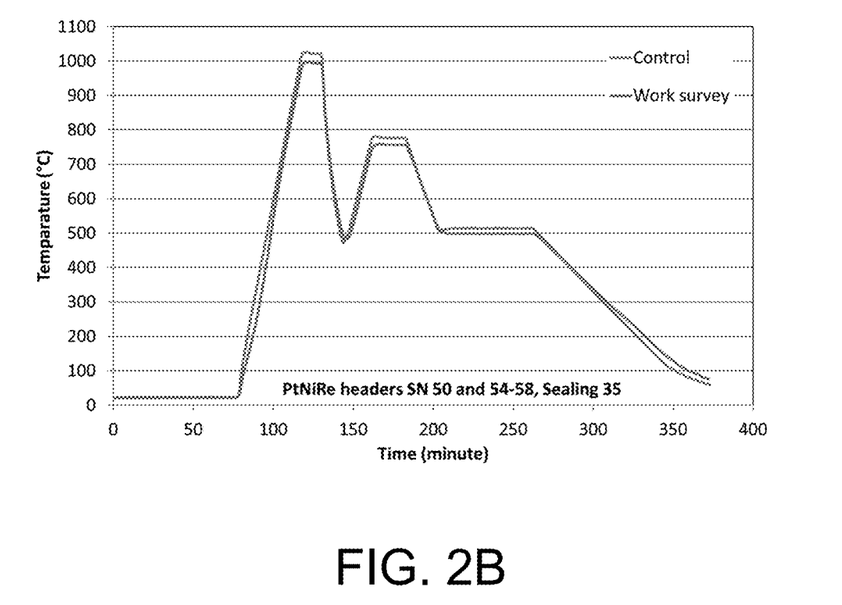
FIG. 2B is a thermal profile for a glass-ceramic seal with a Deriney-72 pin alloy.

In making a hermetic seal, it is important that the thermal expansion characteristics of the metals and glass-ceramic be sufficiently well matched to reduce tensile residual stresses in the seal and so that the materials form a good bond. According to the present invention, the glass-ceramic can be processed differently from that described above for the Paliney-7 pin material in order to develop the proper CTE to be compatible with the Pt—Ni-based pin alloy. That is, the degree of crystallization of the glass matrix into the ceramic phases can be controlled during the thermal profile of the sealing process, thereby "dialing in" the correct CTE. FIG. 2B shows a thermal profile used with the exemplary seal. The hermetic electrical feedthrough can be fabricated by heating the seal assembly (stainless steel shell, glass-ceramic preform, and Deriney-72 pin) with fixturing to high temperature (approximately 990-1000° C.) to reflow the glass and bond to the metal parts. The subsequent cooling steps and isothermal hold steps develop the correct assemblage of crystals within the glassy matrix of the glass-ceramic in order to repeatably produce a glass-ceramic with CTE of approximately 12.65 ppm/° C., which is slightly above the CTE of the Deriney-72 pin material (~11.9 ppm/° C.) and below the CTE of the outer stainless steel shell (~18-19 ppm/° C.). In general, the CTE of the glass-ceramic can be in the 11-17 ppm/° C. range, and more preferably 12-14 ppm/° C. A final isothermal hold at 500° C. can be used to induce relaxation of stresses in the glass-ceramic (near the glass transition temperature) to limit the possibility of cracking and loss of hermeticity. The Deriney-72 alloy develops high strength and hardness during glass-ceramic sealing with this thermal profile. The Deriney-72 alloy has a Knoop hardness of at least 340 HK and as high as about 400 HK after sealing.

Figure 3:
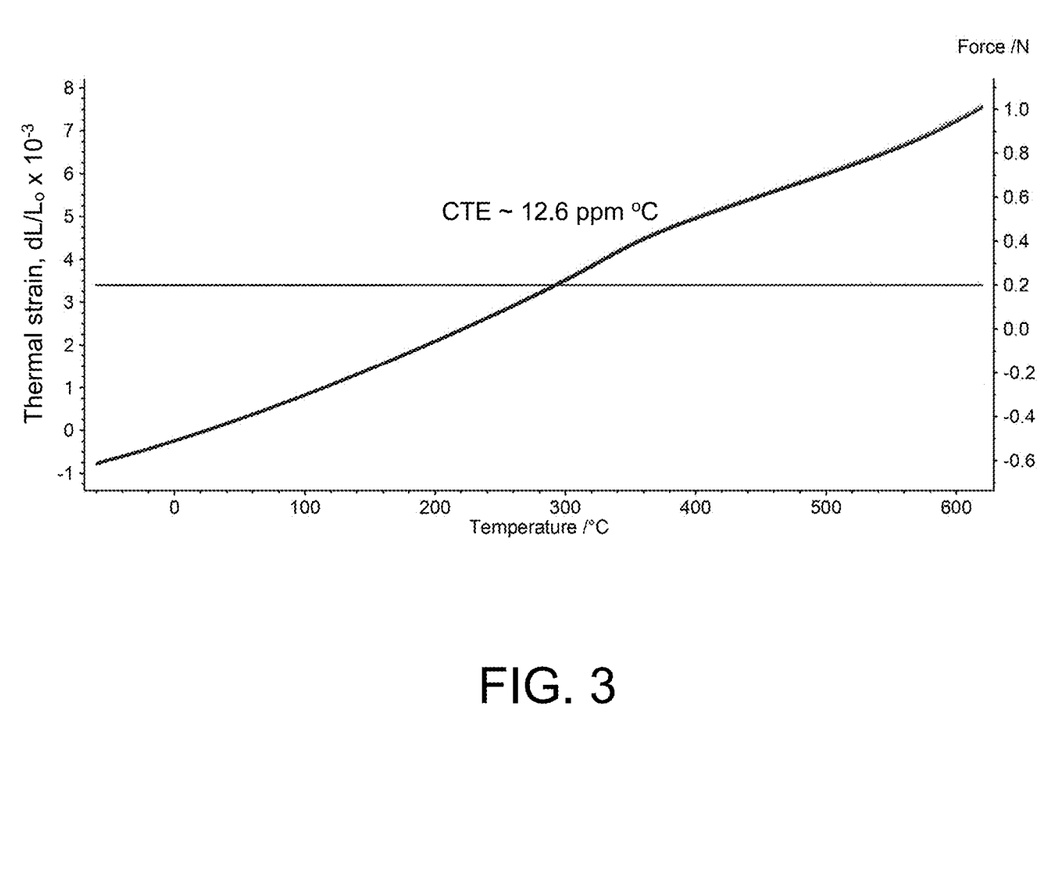
FIG. 3 is a graph of thermal strain as a function of temperature of the glass-ceramic having processing using the thermal profile shown in FIG. 2B.

A compressive residual stress state is desired in glass- or glass-ceramic-to-metal seal systems to maintain good interfacial bonding and to prevent (tensile) cracking within the glass-ceramic. The lower CTEs of the Deriney-72 pin material and glass-ceramic provide a larger difference in CTE between the glass-ceramic and the outer stainless steel shell, effectively imparting a "higher compression" upon the glass-ceramic. The thermal strain in the glass-ceramic as a function of temperature, obtained using the thermal sealing process described above is shown in FIG. 3. Importantly, the CTE developed with this sealing profile is "near linear" as a function of temperature. The near-linear CTE has been found to be important for reducing stresses within the glass-ceramic by limiting the amount of cristobalite, which shows a phase inversion accompanied by a large ~2 vol % abrupt volume change within the glass-ceramic at temperatures close to 220° C. See S. Dai et al., *J. Am. Ceram. Soc.* 99(11), 3719 (2016). In particular, a non-linear CTE curve can cause loss of compression at some operating temperatures that can compromise hermeticity at the glass-ceramic/shell interface. Therefore, the Pt—Ni—Re pin alloy improves the robustness of seals with regard to this failure mechanism.

Figure 4:
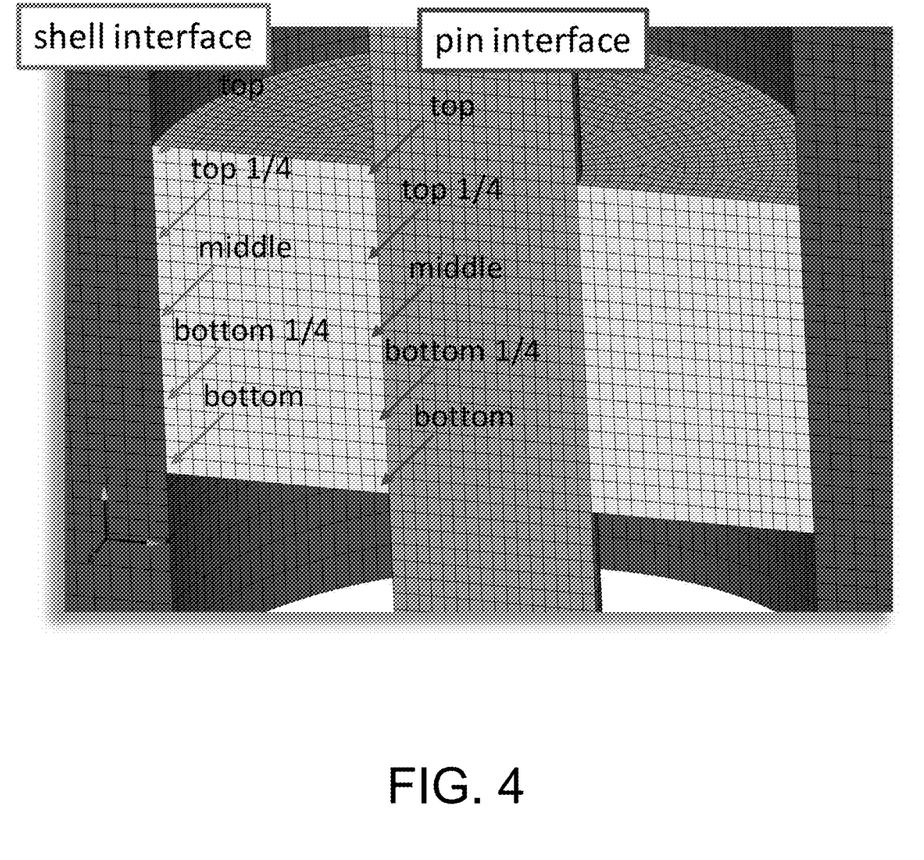
FIG. 4 illustrates a finite element analysis (FEA) simulation of a single pin of a 6-pin header, showing various locations at which stresses in the glass-ceramic were calculated.

Finite element analysis (FEA) of a 6-pin header was performed to qualitatively compare several glass-ceramic CTEs and examine the evolution of stress during manufacturing and post-manufacturing thermal environments. A model of the FEA simulation of a single pin is illustrated in FIG. 4, showing various locations at which stresses in the glass-ceramic were calculated. A quarter symmetry model was used with symmetry constraint boundary conditions to reduce computational costs. A non-temperature dependent elastic material model was used to predict the behavior of the Deriney-72 pins, a temperature dependent elastic model was used for the glass-ceramic seals, and a viscoplastic model was used for the 304L VAR shell. The analysis begins at an assumed stress-free temperature of 600° C. (close to the glass transition temperature of the glass-ceramic) and cools to room temperature (20° C.) before cooling further to −55° C. and then reheating to 500° C. as part of a post-manufacturing thermal cycle. The FEA was used to examine a broad range of glass-ceramic CTEs and the predictions were compared qualitatively for "least tensile" stress state. The most favorable stress state examined during the applied thermal history was using glass-ceramic seals with a CTE of 12.57 ppm/° C.

Figure 5A:
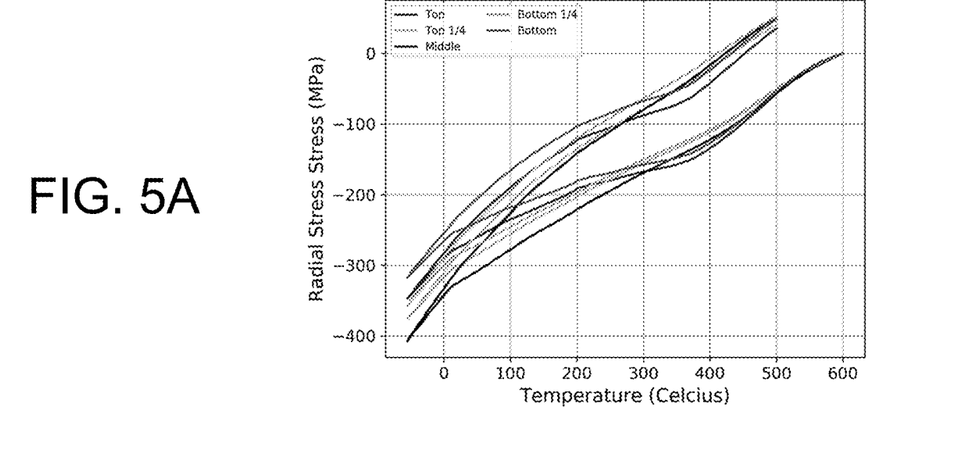
FIG. 5A is a graph of the radial stress at various locations in the glass-ceramic of a feedthrough with a Deriney-72 pin alloy and a glass-ceramic with a CTE of 12.57 ppm/° C.
Figure 5B:
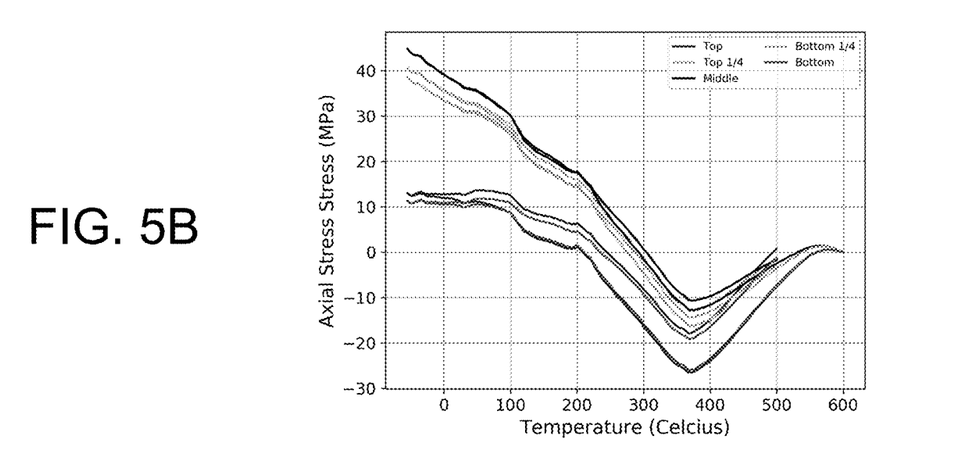
FIG. 5B is a graph of the axial stress at the various locations in the glass-ceramic.
Figure 5C:
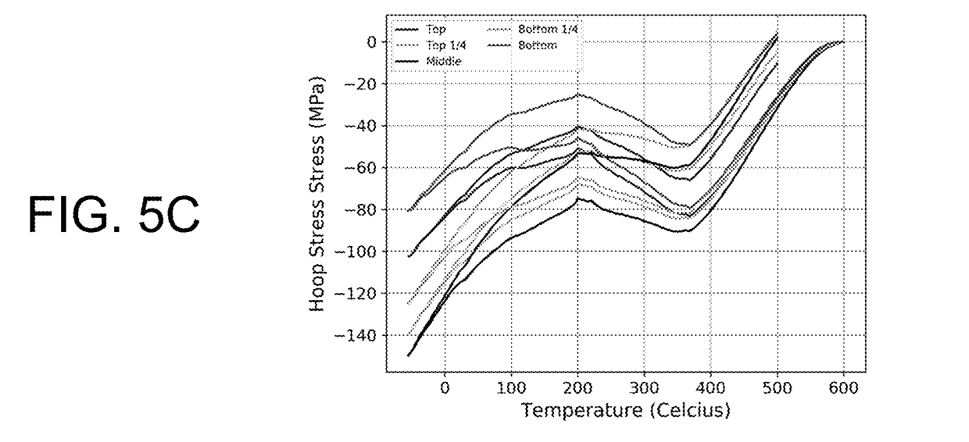
FIG. 5C is a graph of the hoop stress at the various locations in the glass-ceramic.

The FEA results are displayed in FIGS. 5A-5C for locations near the "top" and "bottom" of the glass-ceramic, the middle of the glass-ceramic, and the positions between the top and center (top ¼) and bottom and center (bottom ¼) of the seals. The FEA modeling showed that stresses within the glass-ceramic near the glass-ceramic/pin interface remain mainly compressive after sealing. However, some tensile stresses are shown in FIG. 5B for stresses in the axial direction adjacent to the pin near the glass-ceramic/pin interface. Only the "middle", "top ¼", and "bottom ¼" positions show the development of tensile stresses. If the tensile stresses are high enough, cracks can be expected to form in the glass-ceramic in the radial direction (perpendicular to the pin). Indeed, small cracks were observed near the middle of the seal with some thermal profiles. The cracks were relatively short (~150 microns in length) and grow from the pin radially into the glass-ceramic. However, with the preferred sealing profile, only a single radial crack was found. Further, none of the cracks were long enough to compromise hermeticity in any of the seals examined.

This ceramic crystallization process also improves the mechanical properties of the glass-ceramic during electrical feedthrough operation compared to conventional amorphous glass seals. The higher strength of the Deriney-72 pin alloy (500 Vickers as received) also means that no plastic deformation of the pin is expected during thermal cycle environments. Yielding of metallic piece parts during thermal cycling can lead to the development of unwanted tensile stresses in the glass-ceramic which increases the risk of cracking and potential loss of hermeticity. As described above, the exemplary Deriney-72 pin alloy develops a higher hardness (greater than 340 HK) after sealing than previous pin alloys (e.g. Paliney-7). This higher hardness provides better wear resistance in sliding electrical contact applications. This characteristic is desirable, in particular for fatigue applications where electrical contacts undergo repeated contact cycles with a mating contact (thousands of cycles).

Figure 6A:
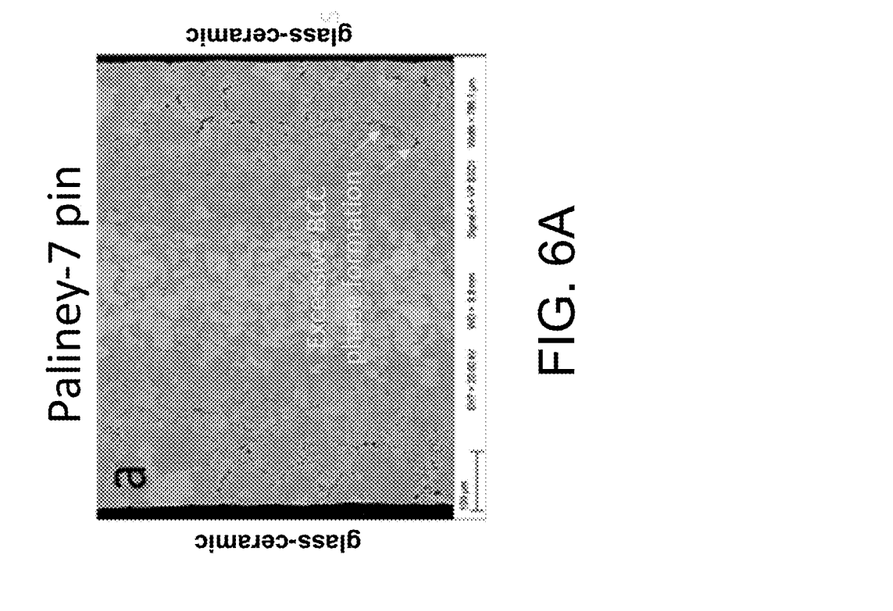
FIG. 6A is a scanning electron micrograph (SEM) in backscatter electron (BSE) mode showing the microstructure in a Paliney-7 pin after processing of the glass-ceramic to metal seal according to the thermal profile shown in FIG. 2A.
Figure 6B:
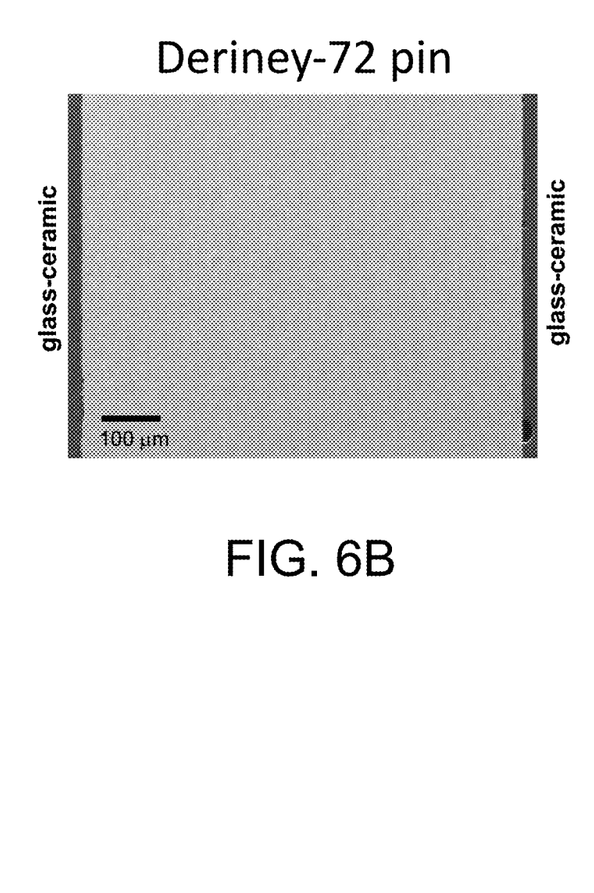
FIG. 6B is a SEM showing the microstructure in a Deriney-72 pin after processing according to the thermal profile shown in FIG. 2B. The contrast in the BSE micrographs in FIGS. 6A and 6B indicates the atomic number difference of different phases within the pin microstructures.
Figure 7A:
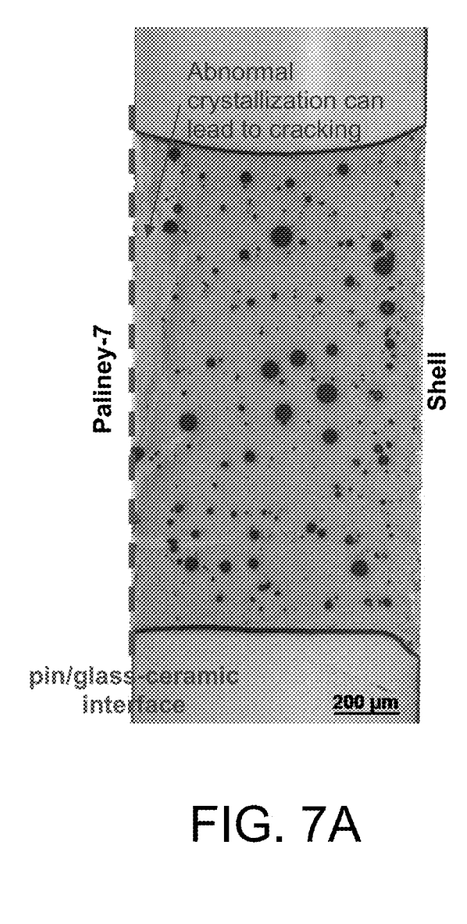
FIG. 7A is a SEM of the glass-ceramic seal with a Paliney-7 alloy pin material, showing abnormal crystallization and partial melting at the pin-glass-ceramic interface.
Figure 7B:
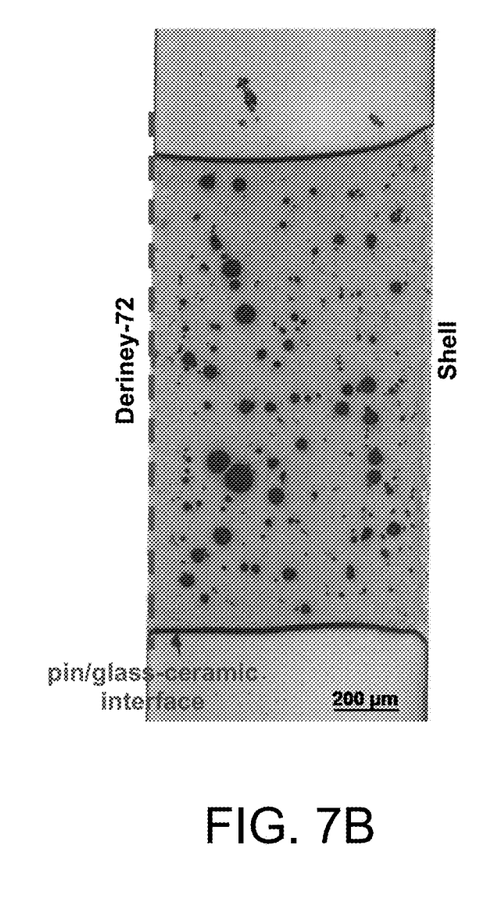
FIG. 7B is a SEM of the glass-ceramic seal with a Deriney-72 alloy pin material.

Extensive phase formation has been observed within the prior Paliney-7 pin material, especially near the pin/glass-ceramic interface, as shown in FIG. 6A. In particular, a phase with body-centered-cubic (BCC) crystal structure has been identified within the normally face-centered-cubic (FCC) Paliney-7 alloy. Phase formation occurs due to interdiffusion between the Paliney-7 pin and the BPS glass-ceramic during sealing. In particular, the BCC phase appears to be promoted by an uptake of zinc (Zn) and phosphorous (P) from the adjacent glass-ceramic. Energy-dispersive spectroscopy (EDS) at the interface indicated diffusion of Zn and P at a distance of ten microns into the Paliney-7 pin. The formation of coarse phases within the pin alloy can lead to lower hardness in the seal region, as low as 230 Knoop. The uptake of Zn and P at the pin surface comes with a concomitant depletion of these elements from the glass-ceramic. This depletion of P from the glass-ceramic can, in turn, cause depletion of lithium phosphate ($Li_3PO_4$) particles, which are a ceramic nucleating agent in the glass-ceramic. This results in the formation of a zone of "abnormal crystallization" in the glass-ceramic. The abnormal crystallization represents a microstructure dominated by crystal growth (resulting in few large crystals) rather than the nucleation of many fine ceramic crystals. An example of abnormal crystallization is shown in FIG. 7A. Conversely, the Deriney-72 pin shows little or no second phase formation, as shown in FIG. 7B. A slight buildup of Zn was evident by EDS at the pin/glass-ceramic interface, but no new internal phase formation was observed. Intimate contact is observed between the pin and glass-ceramic, indicating wetting of the pin by the molten glass-ceramic during the thermal sealing process, as shown in FIG. 7B. In addition, because abnormal crystallization occurs during initial cooling from sealing temperature (1000° C.), the faster cooling shown in FIG. 2B, which was developed to produce the lower CTE necessary for Deriney-72 pins, also does not allow enough time for significant abnormal crystal growth. This illustrates another advantage of the new glass-ceramic-to-metal seal materials system and new thermal sealing profile.

The diminished interdiffusion between the pin and glass-ceramic could be due to the more "refractory" nature of the Deriney-72 alloy. The Deriney-72 pin alloy has a much higher melting point (approximately 1550° C.) compared to previous pin materials, such as Paliney-7 (m.p. ~1065° C.). See P. Nash and M. F. Singleton, *Bulletin of Alloy Phase Diagrams* 10, 258 (1989). As described above, glass-ceramic sealing is performed at high temperatures of approximately 1000° C. In that sealing temperature range, interdiffusion of elements between the glass-ceramic into the pin alloy can occur quickly and lower the melting point of the lower-melting Paliney-7 pin material even further, making it too close to the seal processing temperatures. Indeed, partial pin melting of Paliney-7, a severe processing problem, has been observed. The higher melting point of the Deriney-72 pin alloy means that seal processing will take place at a lower homologous temperature (lower fraction of the melting point), compared to Paliney-7. In general, the higher melting point of Deriney-72 provides significantly increased margin with respect to partial melting of the pin during processing. Further, because sealing is performed at a lower homologous temperature in Deriney-72 (because it has a higher melting temperature compared to Paliney-7), less interdiffusion of elements takes place between the Deriney-72 pin and the glass-ceramic, thereby reducing or eliminating the presence of interfacial zones with unfavorable microstructures, as described above. Therefore, large crystal growth and associated cracking have not been observed when using the Deriney-72 alloy pins of the present invention.

Leak testing has been performed on multi-pin headers with a shell of a racetrack geometry, as described in U.S. Pat. No. 8,082,663. The sealed assemblies were hermetic to a level below $1 \times 10^{-8}$ cc helium/sec with a glass-ceramic CTE in the range of 12 to 14 ppm/° C. The headers were further subjected to thermal shocks between −55 and 85° C. and remained hermetic. These results indicate that the electrical feedthroughs are suitable for both low and high temperature service applications in which hermeticity is required.

The present invention has been described as a hermetical electrical feedthrough comprising a Pt—Ni-based pin alloy. It will be understood that the above description is merely illustrative of the applications of the principles of the present invention, the scope of which is to be determined by the claims viewed in light of the specification. Other variants and modifications of the invention will be apparent to those of skill in the art.

We claim:

1. A hermetic electrical feedthrough, comprising:
   a stainless steel shell having a feedthrough opening,
   an electrical feedthrough pin comprising 65 to 80 wt. % Pt, 18 to 27 wt. % Ni, and 2 to 8 wt. % Re within the feedthrough opening in the stainless steel shell, and
   a glass-ceramic encasing the electrical feedthrough pin and forming a hermetic seal to the stainless steel shell and the electrical feedthrough pin.

2. The hermetic electrical feedthrough of claim 1, wherein the stainless steel shell comprises an austenitic stainless steel alloy.

3. The hermetic electrical feedthrough of claim 2, wherein the austenitic stainless steel alloy comprises type 304L or Nitronic 40 stainless steel.

4. The hermetic electrical feedthrough of claim 1, wherein the glass-ceramic comprises a lithium aluminosilicate glass-ceramic.

5. The hermetic electrical feedthrough of claim 4, wherein the lithium aluminosilicate glass-ceramic is composed of 65-80 wt. % $SiO_2$, 8-16 wt. % $Li_2O$, 2-8 wt. % $Al_2O_3$, 1-5 wt. % $P_2O_5$, 1-8 wt. % $K_2O$, 0.5-7 wt. % $B_2O_3$, and 0-5 wt. % ZnO.

6. The hermetic electrical feedthrough of claim 1, wherein the glass-ceramic has a coefficient of thermal expansion of between 11 to 17 ppm/° C.

\* \* \* \* \*